Patented Apr. 17, 1928.

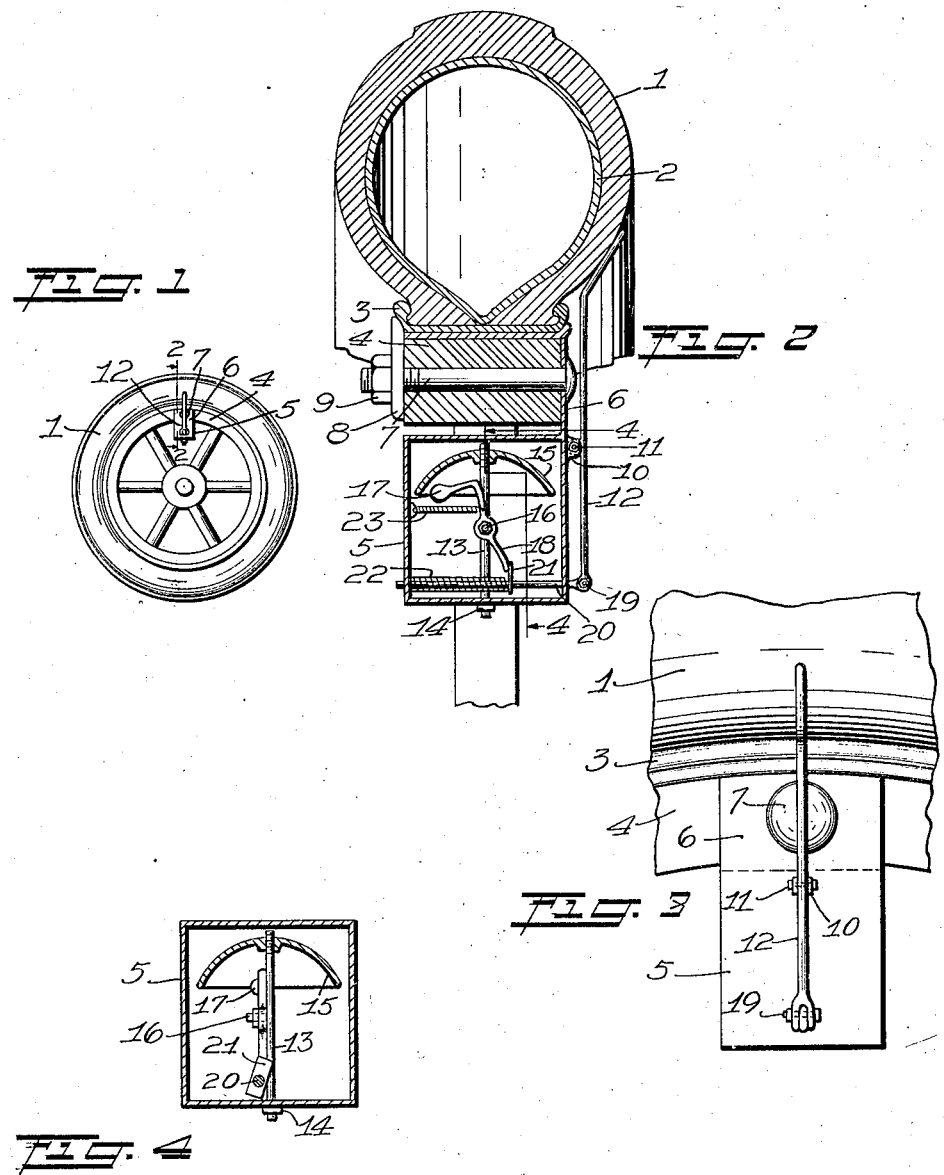

1,666,155

UNITED STATES PATENT OFFICE.

LEWIS H. UNGLESBY, OF BATON ROUGE, LOUISIANA, ASSIGNOR OF ONE-HALF TO MERRILL H. HUGHES, OF BATON ROUGE, LOUISIANA.

PNEUMATIC-TIRE SIGNAL.

Application filed October 25, 1926. Serial No. 144,105.

My invention relates to improvements in signals for pneumatic tires to indicate when they are abnormally deflated, and it consists in the combinations, constructions, and arrangements herein described and claimed.

An object of my invention is to provide a simple device which will give an audible warning when the pressure within the tire has decreased beyond a definite amount.

A further object of the invention is to provide a device of the type described which can be readily applied to the wheels of automobiles equipped with pneumatic tires with comparatively little trouble.

A further object is to provide a device of the type described, which is so situated as to prevent the apparatus from being injured.

Other objects and advantages will appear in the following specification, and the novel features of the invention will be particularly pointed out in the appended claim.

My invention is illustrated in the accompanying drawings, forming part of this application, in which Figure 1 is a side view of a wheel equipped with my invention, Figure 2 is an enlarged section along the line 2—2 of Figure 1, Figure 3 is a side view of the device shown in Figure 2, and Figure 4 is a section along the line 4—4 of Figure 2.

In the drawings, 1 indicates the outer casing, and 2 the inner casing of a pneumatic tire which is secured to a rim 3 on a metal covered felly 4, the construction thus far described being that ordinarily found in automobiles of the present type. My improvement consists in providing a housing 5 of any suitable material, having an extension 6 on one side thereof, by means of which it may be secured to the felly 4. To this end I provide a bolt 7 which extends through the felly and through a retaining plate 8 on the opposite side of the felly, a nut 9 being used to hold the bolt in position.

On the exterior of the casing is a lug 10 to which is pivotally connected at 11 an arm 12, which, as will be observed, extends into contact with that portion of the outer casing 1 adjacent to the rim.

On the inner side of the casing is a post 13 which is secured to the casing in any suitable manner, as by a nut 14. This post bears a bell 15 at its end. Pivotally mounted at 16 on the post is a clapper 17, having an arm 18, which extends beyond the pivotal point. The rod 12 is pivotally connected at 19 with a slidable rod or bar 20, which passes through the casing, being journaled in the walls of the casing, as shown. This rod 20 has a finger 21 secured thereto, which is arranged to engage the extension 18. A spiral spring 22 surrounds the rod 20 and bears at one end against the casing wall, and at the other on the finger 21. A spiral spring 23 is connected at one end to the casing wall and at the other end to the clapper shank on the opposite sides of the pivot 16 from the extension 18.

From the foregoing description of the various parts of the device, the operation thereof may be readily understood. As long as the tire is filled with air, there will be relatively little movement of the tire at the point of contact of the rod 12 therewith. When, however, the tire is deflated beyond a given amount, then the movement of the vehicle will cause the tire to give, so as to move the rod 12 outwardly at every revolution of the wheel. This will cause the rod 20 to be pushed inwardly against the tension of the spring 22, and the finger 21 will act on the extension 18 to throw the clapper 17 against the bell 15, thus giving an audible warning that the tire has reached a point where it should be inflated.

When the tire is inflated, the conditions are as before, and a very slight movement of the tire will not be sufficient to throw the clapper against the bell. It will be seen that I have provided a warning signal which is automatically operated whenever the deflation of the tire reaches a predetermined point.

I claim:

A signaling device for pneumatic tires, comprising a casing having an extension on one side thereof, means for securing said extension to the felly of a wheel, a lever pivotally mounted on the outside of the casing and arranged to be engaged by the movement of the tire when the latter is partially deflated, a bell disposed within the casing, a pivotally mounted clapper, a spring-pressed slidable bar carried by the casing and being pivotally connected with the lever, a finger carried by said slidable bar and arranged to engage one end of said pivoted clapper for initially moving and subsequently releasing the latter, and a spring connected to said clapper for retracting the same after its release by the finger.

LEWIS H. UNGLESBY.